United States Patent [19]

Nilsson et al.

[11] 4,100,798

[45] Jul. 18, 1978

[54] FLOW METER WITH PIEZO-CERAMIC RESISTANCE ELEMENT

[75] Inventors: Kenth Nilsson, Akersberga; Olov Ekström, Brottby, both of Sweden

[73] Assignee: Siemens Aktiengesellschaft, Berlin & Munich, Germany

[21] Appl. No.: 782,189

[22] Filed: Mar. 28, 1977

[30] Foreign Application Priority Data

May 18, 1976 [DE] Fed. Rep. of Germany ....... 2622117

[51] Int. Cl.² .............................................. G01F 1/36
[52] U.S. Cl. ................... 73/194 E; 310/330; 310/369
[58] Field of Search .......... 73/194 E, 205 R, DIG. 4; 310/330, 369; 128/142.2

[56] References Cited

U.S. PATENT DOCUMENTS

| | | | |
|---|---|---|---|
| 2,687,147 | 8/1954 | Feichter | 138/44 |
| 3,504,542 | 4/1970 | Blevins | 73/205 |
| 3,561,831 | 2/1971 | Alibert et al. | 73/194 E |

FOREIGN PATENT DOCUMENTS 1,492,973   7/1967   France.

*Primary Examiner*—Jerry W. Myracle
*Attorney, Agent, or Firm*—Hill, Gross, Simpson, Van Santen, Steadman, Chiara & Simpson

[57] ABSTRACT

A flow meter particularly for receiving respiratory flows for pulmonary function diagnoses has a perforated piezo-ceramic flow resistance element and transducer in a flow tube for providing a highly-sensitive flow measurement with little resistance to the flow. Electric contact plates abut opposite planar faces of the piezo-ceramic material plate and are spaced apart at the periphery of the piezo-ceramic plate by an insulating disk. Frame members carry the piezo-ceramic plate and electric contact plates and are spaced and protected within a housing of the flow meter by soft, floating seal members. Contact lugs connected to the electric contact plates conduct signals from the meter which are a function of the bending of the piezo-ceramic material plate under the differential flow pressures on an upstream and a downstream side of the piezo-ceramic plate.

7 Claims, 1 Drawing Figure

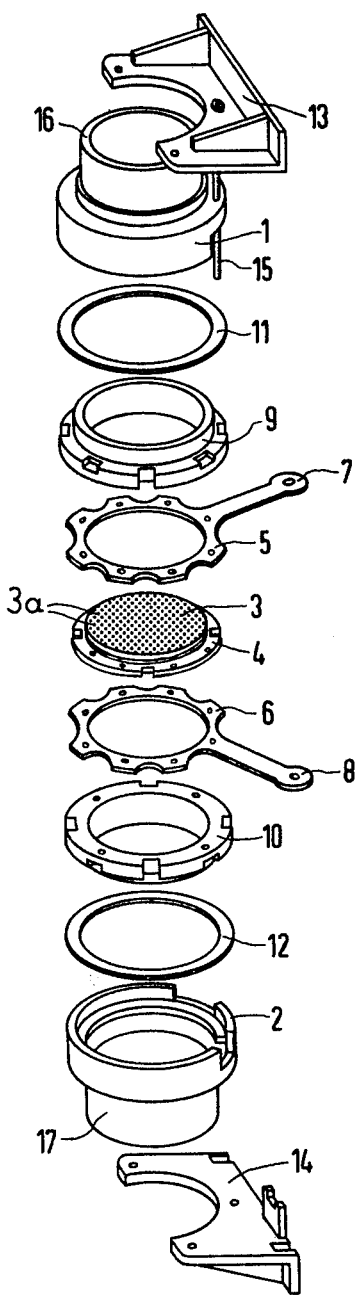

FLOW METER WITH PIEZO-CERAMIC RESISTANCE ELEMENT

BACKGROUND OF THE INVENTION

1. Field of the Invention

The invention relates to flow meters for measuring flow volumes, particularly in a flow of gas such as in pulmonary function diagnoses, wherein a flow resistance comprises a mechanical-electrical transducer disposed in a flow tube.

2. The Prior Art

Flow meters are known wherein the drop in pressure across a flow resistance is measured by a differential pressure-sensitive device connected by lines into opposite interior spaces of a flow tube divided by the resistance element. The flow resistance is a fine-meshed wire net. Such flow meter is complex since it is constructed into two parts.

A one-piece flow meter is shown in U.S. Pat. No. 2,989,866, comprising a wire resistance strain gage incorporated in the flow resistance element. Although differential pressure is measured, the wire strain gage complicates flow meter construction, is somewhat unreliable, and provides more resistance to flow of air in one direction than in the other flow direction through the tube.

SUMMARY OF THE INVENTION

In an air flow meter, a flow resistance element comprises a piezo-ceramic transducer plate having apertures therethrough. The piezo-ceramic plate is disposed within a flow tube and entirely occupies the axial cross-section thereof. A pair of electrically-conductive contact plates which are annular in form contact opposite sides of the piezo-ceramic plate at the axial faces on peripheries thereof. Each of the contact plates has a contact lug for communicating distortions in the piezo-ceramic material to a remote point such as a monitoring apparatus. The piezo-ceramic material and the contact plates are held within frame members which are, in turn, supported within the flow meter housing upon soft, floating seal members which cushion the piezo-ceramic material within a housing member from shocks due to accident and from normal apparatus vibrations. The invention thus provides a compact flow meter with few individual parts through which gas flows symmetrically in both directions, and having high reliability despite its use of the piezo-ceramic transducer. The transducer sets can be standardized by use of a capacitor in conjunction with the contact lugs of the contact plates.

THE DRAWING

The one drawing FIGURE is an exploded perspective view of the parts of the flow meter of the present invention.

THE PREFERRED EMBODIMENTS

A flow meter according to the invention has a flow tube formed by two coaxial housing parts 1, 2. A piezo-ceramic material plate 3 forms a flow resistance and transducer element disposed in a longitudinal center of the flow tube on the axis of the meter. The plate 3 has a great plurality of small perforations 3a therein to permit through-flow of a respiratory gas or other fluid. An insulating disk 4 surrounds a circular periphery of the flow resistance plate 3 to ensure separation of metal contact plates 5, 6 which are annular in form and are placed in adjoining axial relation to the plate 3. Contact lugs 7, 8 extend respectively from the contact plates 5, 6 for connection to a remote monitoring or recording device (not shown) for converting distortions in the piezo-ceramic plate 3, as indicated by the electrical characteristics thereof, into differential pressure terms and/or flow volume terms.

The piezo-ceramic plate 3, the insulating disk 4, and the contact plates 5, 6 are assembled into a flow resistance and transducing set between opposite frame members 9, 10. The frame members 9, 10 are attached to one another by clamps or screws, not shown. The elements 3–10 are flexibly suspended between seals 11, 12, engaging the frame members 9, 10 within the housing parts 1, 2. The seals 11, 12 insulate the piezo-ceramic plate 3 from vibrations in the housing 1, 2, thus increasing the accuracy of the differential pressure readings from the transducer element by reducing interference with the piezo-ceramic plate 3. The seals 11, 12 also protect the piezo-ceramic material 3 from damage due to accidental shocks, such as dropping the meter tube onto a hard floor.

Supporting mountings 13, 14 for the flow meter are joined together by screws 15 with the parts 1–12 clamped therebetween. The support mountings 13, 14 are readily attached to a housing, not shown, of a pulmonary function monitoring and recording instrument. Tube connections 16, 17 on the flow meter extend outwardly from the support mountings 13, 14 and are adapted to receive thereover a respiratory tube connected to a mouthpiece for a patient. The other of the tubes 16, 17 not connected to the mouthpiece may be connected to further apparatus or be left open to atmosphere.

In operation, as the patient breathes through the respiratory tube, the piezo-ceramic flow resistance element 3 distorts very slightly under the differential flow pressure thereacross. The piezo-ceramic material converts the pressure difference into an electrical signal. The signal is passed by the contact plates 5, 6 and the contact lugs 7, 8 to the monitoring apparatus. With the flow meter of the present invention, a large output signal with a high limiting frequency, in excess of 300 Hz, and with minimum superimposed interference as from vibration, can be produced. Where a number of flow meters are to be used interchangably, a significant advantage of the present invention is that the output signals of each of the individual flow meters can be standardized very easily by connecting a capacitor to the transducer element output. The small flow resistance of the meter together with its high output signal allows very small respiratory flows to be measured.

Although various minor modifications may be suggested by those versed in the art, it should be understood that we wish to embody within the scope of the patent warranted hereon all such modifications as reasonably and properly come within the scope of our contribution to the art.

We claim as our invention:

1. A flow meter for medical pulmonary function diagnoses comprising:

a flow tube having an interior cross-section;

a flow resistance element comprising a piezo-ceramic material having through-flow passages for a respiratory gas; and an electrical contact means associated operatively with said flow resistance element for measuring electrical characteristics of the piezo-ceramic material as a gas is passed through the meter.

2. A flow meter as defined in claim 1, wherein the piezo-ceramic material comprises a plate and the through-flow openings comprise perforations in the plate.

3. A flow meter as defined in claim 1, wherein the flow resistance is disposed in the flow tube across the entire cross-section thereof.

4. A flow meter as defined in claim 1, wherein the piezo-ceramic material is a flat sheet having opposite planar sides and the electrical contact means comprise a pair of annular contact plates, each contact plate fitted adjacent a periphery of one of said opposite planar sides of said piezo-ceramic material.

5. A flow meter as defined in claim 4, each contact plate further having a contact lug from which an electrical signal may be communicated, as to a monitoring apparatus.

6. In a flow meter for pulmonary function diagnoses having a flow tube with a cross-sectional area, the improvement of a flow resistance element comprising:
a piezo-ceramic material formed in a plate having opposite first and second sides to obstruct substantially the entire area of the flow tube but having perforations therein for passage of respiratory gases from one side of the plate to the other; and
a pair of electrically-conductive contact plates, each of said contact plates being annular in form and contacting one of the first and second sides of the piezo-ceramic material plate about a periphery thereof.

7. A flow meter having an axis and adapted for use with a respiratory gas and comprising:
a piezo-ceramic material plate formed with perforations therethrough and having a periphery and opposite first and second planar faces;
first and second electrical contact plates each respectively coaxially abutting said first and second faces of the piezo-ceramic plate adjacent said periphery thereof, and each of said contact plates having a connection lug extending therefrom;
coaxial first and second frame members respectively abutting the first and second contact plates and respectively adjacent the first and second sides of the piezo-ceramic plate, the frame members being connected together about the contact plate and the piezo-ceramic plate to form a flow resistance and transducing set with the connection lugs extending therefrom;
first and second soft, floating seals, one disposed adjacent each axial side of the flow resistance and transducing set frame members; and
a pair of housing parts adapted to enclose the flow resistance and transducing set and to engage the seals thereon to support the piezo-ceramic material against shocks and vibrations transmitted to the housing,
thereby to provide a compact, reliable, highly sensitive flow meter assembly.

* * * * *